United States Patent
Rai et al.

(10) Patent No.: US 10,402,590 B2
(45) Date of Patent: Sep. 3, 2019

(54) METHOD AND SYSTEM FOR MASKING OF CHEQUE IMAGE BASED ON USER ACCESS PRIVILEGES

(71) Applicant: Infosys Limited, Bangalore (IN)

(72) Inventors: Harikrishna Gandhinagara Narayana Rai, Bangalore (IN); Sivaram Vargheese Thangam, Kappukadu (IN); Krishnamurthy Sai Deepak, Vinoba Nagar (IN); Radha Krishna Pisipati, Hyderabad (IN)

(73) Assignee: Infosys Limited, Bangalore (IN)

( * ) Notice: Subject to any disclaimer, the term of this patent is extended or adjusted under 35 U.S.C. 154(b) by 69 days.

(21) Appl. No.: 15/263,246

(22) Filed: Sep. 12, 2016

(65) Prior Publication Data
US 2017/0076114 A1   Mar. 16, 2017

(30) Foreign Application Priority Data
Sep. 11, 2015   (IN) ............... 4838/CHE/2015

(51) Int. Cl.
*G06F 21/00* (2013.01)
*G06F 21/62* (2013.01)
(Continued)

(52) U.S. Cl.
CPC ..... *G06F 21/6254* (2013.01); *G06Q 20/0425* (2013.01); *G07D 7/206* (2017.05);
(Continued)

(58) Field of Classification Search
CPC ........... G06F 21/6245; G06F 21/6254; G06F 2221/2141; G06Q 20/042; G07D 7/206; G07D 7/2008
(Continued)

(56) References Cited

U.S. PATENT DOCUMENTS

| | | | | |
|---|---|---|---|---|
| 5,097,517 A | * | 3/1992 | Holt | G06K 9/00 382/137 |
| 5,208,857 A | * | 5/1993 | Lebrat | H04N 7/1696 348/E7.059 |

(Continued)

FOREIGN PATENT DOCUMENTS

| WO | WO0210090 | 12/2002 |
|---|---|---|
| WO | WO2007075573 | 7/2007 |

OTHER PUBLICATIONS

Liu et al., "Automatic Extraction of Items from Cheque Images for Payment Recognition," retrieved from: http://citeseerx.ist.psu.edu/viewdoc/summary?doi=10.1.1.41.9045, 1995, 5 pages.

(Continued)

*Primary Examiner* — Syed A Zaidi
(74) *Attorney, Agent, or Firm* — Klarquist Sparkman LLP (57) ABSTRACT

A method and system masks sensitive fields on a cheque image based one or more access privileges assigned to a user. The method involves receiving a cheque image at a cheque masking engine. A cheque template from one or more cheque templates is selected based on metadata associated with the cheque image. One or more zones of sensitive information associated with the cheque image are identified based on the one or more access privileges assigned to the user and a comparison with the selected cheque template. One or more characters are extracted from the one or more zones of sensitive information. The extracted one or more characters are aliased based on an aliasing rule. Another cheque image is generated by overlaying the one or more zones of sensitive information with the aliased one or more characters.

20 Claims, 8 Drawing Sheets

(51) Int. Cl.
*G07D 7/20* (2016.01)
*G07D 7/206* (2016.01)
*G06Q 20/04* (2012.01)

(52) U.S. Cl.
CPC .... *G07D 7/2008* (2013.01); *G06F 2221/2111* (2013.01); *G06F 2221/2141* (2013.01)

(58) Field of Classification Search
USPC .......................................................... 726/28
See application file for complete search history.

(56) References Cited

U.S. PATENT DOCUMENTS

| | | | | |
|---|---|---|---|---|
| 6,059,185 | A * | 5/2000 | Funk | G06Q 20/04 235/375 |
| 6,823,203 | B2 | 11/2004 | Jordan | |
| 8,270,718 | B2 | 9/2012 | Drory et al. | |
| 8,335,402 | B1 | 12/2012 | Manmatha et al. | |
| 8,452,689 | B1 | 5/2013 | Medina, III | |
| 2002/0188187 | A1* | 12/2002 | Jordan | H04N 1/38 600/407 |
| 2004/0071333 | A1* | 4/2004 | Douglas | G06K 9/726 382/137 |
| 2005/0097046 | A1* | 5/2005 | Singfield | G06Q 20/042 705/42 |
| 2006/0045322 | A1* | 3/2006 | Clarke | G06K 9/186 382/137 |
| 2007/0183000 | A1* | 8/2007 | Eisen | H04N 1/00864 358/452 |
| 2007/0194102 | A1* | 8/2007 | Cohen | G06Q 20/04 235/379 |
| 2009/0252323 | A1* | 10/2009 | Cooper | G06F 21/6218 380/54 |
| 2012/0226600 | A1* | 9/2012 | Dolev | G06K 9/6203 705/38 |
| 2014/0044303 | A1* | 2/2014 | Chakraborti | G06T 7/0002 382/100 |
| 2014/0236790 | A1* | 8/2014 | Smith | G06Q 40/02 705/35 |
| 2014/0355865 | A1* | 12/2014 | Cantley | G06Q 20/042 382/137 |

OTHER PUBLICATIONS

Madasu et al., "Automatic Segmentation and Recognition of Bank Cheque Fields," retrieved from: http://espace.library.uq.edu.au/view/UQ:8657/n84.pdf, *Digital Image Computing: Techniques and Applications* (*DICTA '05*), IEEE, 2005, 7 pages.

* cited by examiner

BANK LOGO

Bank Name
Address Line 1
PO Box 12345

Payee :
Pay Amount (in $) : $662.00
Amount in Words (in Dollars): ________________________(Optional)

WATERMARK

Other bank and Check Details

Signature

METHOD AND SYSTEM FOR MASKING OF CHEQUE IMAGE BASED ON USER ACCESS PRIVILEGES

FIELD OF TECHNOLOGY

The present disclosure generally relates to masking of cheque images and in particular, to a system and method for masking of sensitive fields on a cheque image based on an access privilege assigned to a user.

BACKGROUND

Cheques (e.g., checks) are a type of bill of exchange. Cheques were developed as a way to make payments without carrying large amounts of money physically. A cheque is a negotiable instrument instructing a financial institution to pay a specific amount of a specific currency from a specified transactional account held in a drawer's name with the financial institution.

Although forms of cheques have been in use since ancient times and at least since the 9th century, it was during the 20th century that cheques became a highly popular non-cash method for making payments and the usage of cheques peaked. By second half of the 20th century, as cheque processing became automated, billions of cheques were issued annually. These volumes peaked in or around the early 1990s.

As the volume of cheques increased, several financial institutions may outsource cheque processing activity to third party companies. The third party companies may process millions of cheques per day using dedicated cheque scanners specially designed for producing cheque images from a physical hard copy cheque. The digital cheque copies are processed using available softwares. A Camera Image File Format (CIFF) and an X9 format are some of the financial industry standards for encoding and storing cheque images.

Sensitive information in cheque images may not be disclosed to third party for processing such as Quality Assessment (QA) and testing. One of the solutions the financial institution follow is, creating dummy cheques for processing. Another solution is to mask sensitive information in the cheque images.

Randomly masking sensitive information of the cheque images with non-realistic fields and/or overlaying blank image on the sensitive information may not have effective results in the Quality Assessment (QA) process. Further, masking all fields of cheque image may not be necessary in all situations.

SUMMARY

Disclosed are a method and system for masking of a cheque image based on user access privileges.

In one aspect, a computer implemented method for masking of a cheque image based on one or more access privileges assigned to a user is disclosed. The method involves receiving at a cheque masking engine, a cheque image for masking. A cheque template from one or more cheque templates is selected based on a metadata associated with the cheque image. The one or more cheque templates may be stored in a non-transitory computer readable storage medium associated with the cheque masking engine over a computer network.

One or more zones of sensitive information associated with the cheque image is identified based on the one or more access privileges assigned to the user and a comparison with the selected cheque template. One or more characters are extracted from the one or more zones of sensitive information, through a character recognition technique. The character recognition technique may be, but not limited to an optical character recognition and/or an intelligent character recognition. An OCR technique may be used for extracting typed text from an image. An ICR technique may be used for extracting hand-written or hand-printed text from an image.

The extracted one or more characters from the one or more zones of sensitive information is aliased based on one or more aliasing rules. The one or more aliasing rules may be a modified bijective function. Another cheque image is generated by overlaying the one or more zones of sensitive information with the aliased one or more characters.

In another aspect, a system for masking of a cheque image based on one or more access privileges assigned to a user is disclosed. The system comprises a receiver, a selection engine, an identifier, an extractor, an aliasing engine and an image generator.

The receiver is configured to receive at a cheque masking engine, a cheque image. The selection engine is configured to select a cheque template from one or more cheque templates based on a metadata associated with the cheque image. The one or more cheque templates may be stored in a non-transitory computer readable storage medium associated with the cheque masking engine over a computer network.

The identifier is configured to identify one or more zones of sensitive information associated with the cheque image based on the one or more access privileges assigned to the user and a comparison with the selected cheque template. The extractor is configured to extract one or more characters from the one or more zones of sensitive information, through a character recognition technique. The character recognition technique may be, but not limited to an optical character recognition and/or an intelligent character recognition.

The aliasing engine is configured to alias the extracted one or more characters from the one or more zones of sensitive information based on one or more aliasing rules. The one or more aliasing rules may be a modified bijective function. The image generator is configured to generate another cheque image by overlaying the one or more zones of sensitive information with the aliased one or more characters.

In an additional aspect, a computer implemented method for masking of a cheque image based on one or more access privileges assigned to a user is disclosed. The method involves receiving at a cheque masking engine, a cheque image. One or more pixels information and a metadata associated with the cheque image is extracted. A cheque template from one or more cheque templates is selected based on the metadata associated with the cheque image. The one or more cheque templates may be stored in a non-transitory computer readable storage medium associated with the cheque masking engine over a computer network.

One or more zones of sensitive information associated with the cheque image is identified based on the one or more access privileges assigned to the user and a comparison with the selected cheque template. One or more characters are extracted from the one or more zones of sensitive information, through a character recognition technique. The character recognition technique may be, but not limited to an optical character recognition and/or an intelligent character recognition.

The extracted one or more characters from the one or more zones of sensitive information is aliased based on an aliasing rule. The aliasing rule may be a modified bijective function. One or more alias images are created based on the one or more aliased character. The one or more alias images are overlaid on the cheque image. The step of overlaying may comprise masking the one or more zones of sensitive information the one or more alias images.

The methods and the system disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE FIGURES

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a system for masking of a cheque image based on one or more access privileges assigned to a user. Although the present embodiments have been described with reference to specific example embodiments, it will be evident that various modifications and changes may be made to these embodiments without departing from the broader spirit and scope of the various embodiments.

Any information associated and/or present in the cheque may be a sensitive information. Cheque fields such as a payee name, an amount and an account number may be considered as the sensitive information. There may be multiple approaches available to mask a sensitive information of a cheque image. The approach disclosed in one or more embodiments may be template based method to identify the sensitive information in the cheque image. The sensitive information may be masked by aliasing extracted characters of the sensitive information and overlaying an alias image to achieve masking of the sensitive information of the cheque image. One or more access privileges assigned to a user may also be considered to decide, which sensitive information need to be masked.

Figure 1:
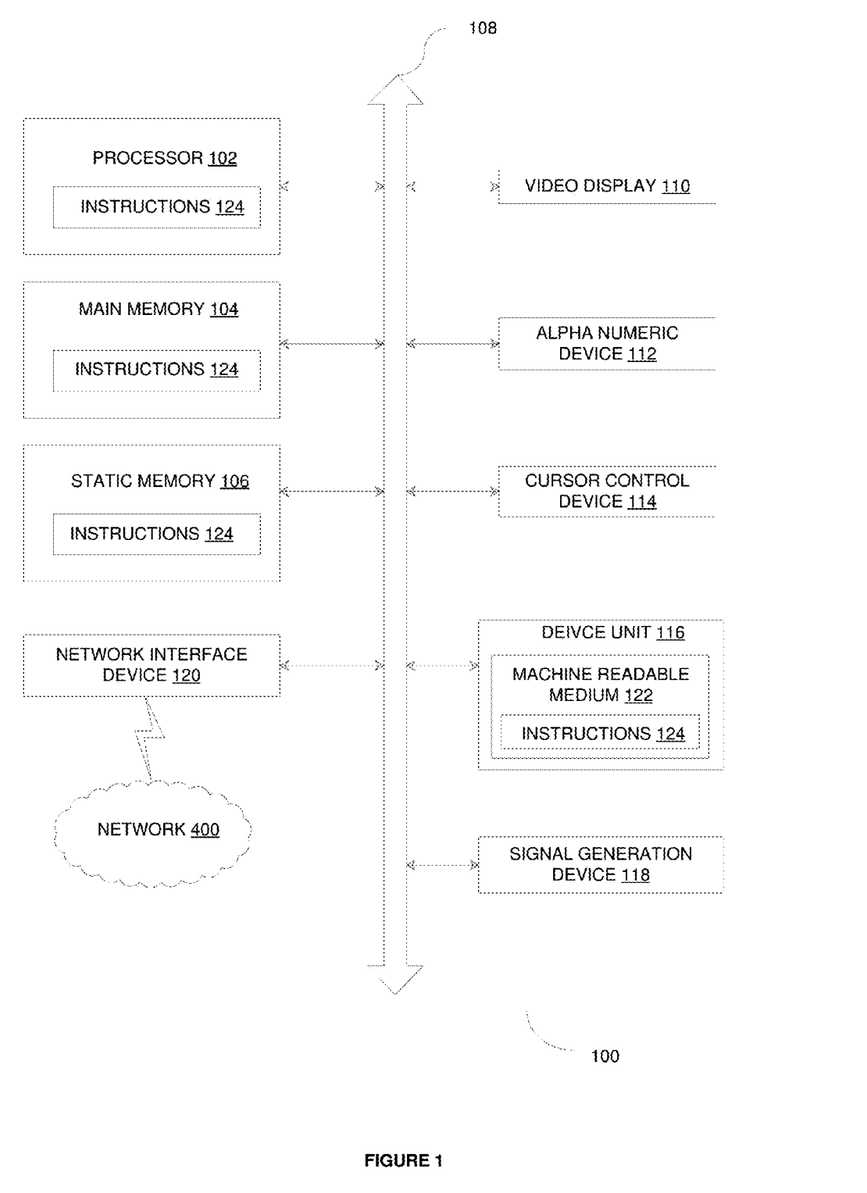
FIG. 1 is a diagrammatic representation of a data processing system capable of processing a set of instructions to perform any one or more of the methodologies herein, according to one embodiment.

FIG. 1 is a diagrammatic representation of a data processing system capable of processing a set of instructions to perform any one or more of the methodologies herein, according to one embodiment. FIG. 1 shows a diagrammatic representation of machine in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and/or as a peer machine in a peer-to-peer (or distributed) network environment. The machine may be a personal-computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104 and/or within the processor 102 during execution thereof by the computer system 100, the main memory 104 and the processor 102 also constituting machine-readable media.

The instructions 124 may further be transmitted and/or received over a network 400 via the network interface device 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Exemplary embodiments of the present disclosure provide a method and a system for masking of cheque image based on one or more access privileges assigned to a user. The method involves receiving at a cheque masking engine, a cheque image for masking. A cheque template from one or more cheque templates may be selected based on a metadata associated with the cheque image. The one or more cheque templates may be stored in a non-transitory computer readable storage medium associated with the cheque masking engine over a computer network.

One or more zones of sensitive information associated with the cheque image may be identified based on the one or more access privileges assigned to the user and a comparison with the selected cheque template. One or more characters are extracted from the one or more zones of sensitive information, through a character recognition technique. The character recognition technique may be, but not limited to an optical character recognition and/or an intelligent character recognition.

The extracted one or more characters from the one or more zones of sensitive information may be aliased based on one or more aliasing rules. The one or more aliasing rules may be a modified bijective function. Another cheque image may be generated by overlaying the one or more zones of sensitive information with the aliased one or more characters.

Figure 2:
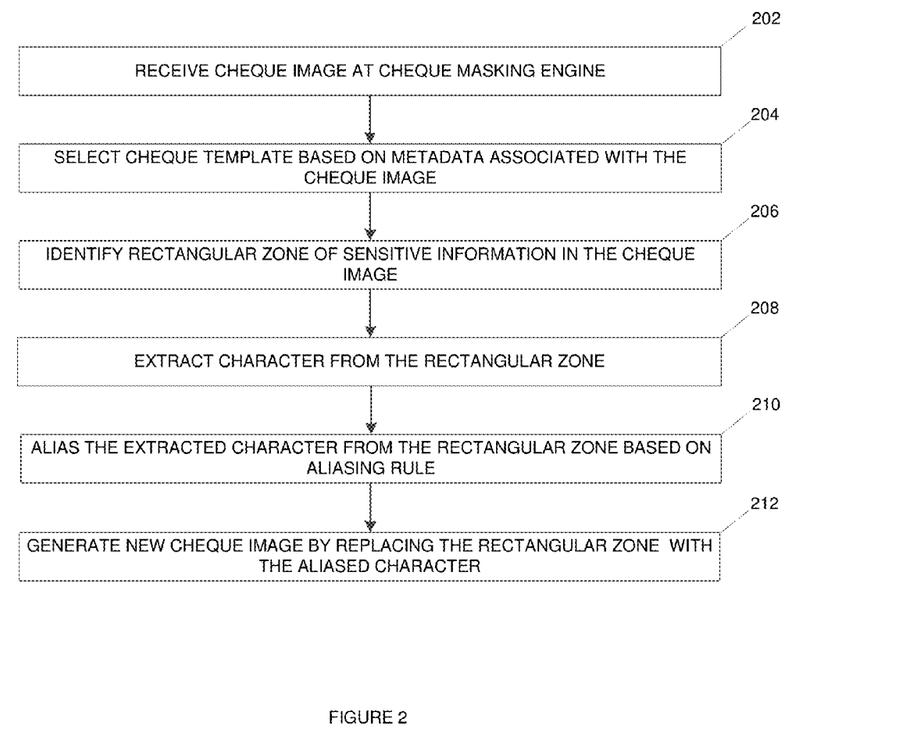
FIG. 2 is a process flow diagram, illustrating a method for masking of a cheque image based on one or more access privileges assigned to a user, according to one or more embodiments.

FIG. 2 a process flow diagram, illustrating a method for masking of a cheque image based on one or more access privileges assigned to a user, according to one or more embodiments. A cheque image may be received at a cheque masking engine over a computer network, as in step 202. In another embodiment, one or more cheque images may be received at the cheque masking engine. The received cheque image may be of, but not limited to, a Camera Image File Format (CIFF) and/or an X9 format. Information of one or more pixels and/or metadata associated with the cheque image may be extracted. The information of one or more pixels may be referred as image data.

In one or more embodiments, the information of one or more pixels may be referred as image data. The information of one or more pixels may be, but not limited to an intensity value(s) at each location of the one or more pixels, one or more statistical measures computed on the intensity value(s) of a neighbor pixels of each of the one the one or more pixels, and one or more features derived based on the intensity values(s) of the neighbor pixels of each of the one the one or more pixels. The one or more features may be a result of one or more mathematical functions operating on the intensity value(s) of the neighbor pixels of each of the one the one or more pixels.

In one or more embodiments, the information of the one or more pixels may be another representation of the cheque image. The intensity values(s) of each location of the one or more pixels may be replaced by another value through one or more predefined mathematical functions. The one or more mathematical functions may be applied on the intensity value(s) of the one or more pixels of the cheque image. The intensity value(s) of the one or more pixels may one or more values indicating a color or a monochrome value at each location of the one or more pixels of the cheque image.

In one or more embodiments the metadata associated with the cheque image may be, but not limited to, date and time of cheque deposit, a camera and/or scanner information used for scanning the cheque image, a depositor name, face value of a cheque, a cheque number, a routing number, a branch code, and a day-wise serial number of the cheque.

A cheque template may be selected from one or more cheque templates, through the computer network, based on the metadata associated with the cheque image as in step 204. In one or more embodiments the cheque template may be a sample cheque image. The one or more cheque templates may be stored in a non-transitory computer readable storage medium associated with the cheque masking engine over the computer network. In one or more embodiments, the non-transitory computer readable storage medium may also be referred as a database. One or more zones of sensitive information associated with the cheque image may be identified based on the one or more access privileges assigned to the user and a comparison with the selected cheque template, as in step 206.

One or more characters from the one or more identified zones of sensitive information may be extracted, through a character recognition technique, as in step 208. The character recognition technique may be, but not limited to an Optical Character Recognition (OCR) technique and/or an Intelligent Character Recognition (ICR) technique. The extracted one or more characters may be a typed character and/or handwritten character. The extracted one or more characters may be aliased based on one or more aliasing rules, as in step 210. The aliasing rule may be a user defined function. The user defined function may be a mathematical function, but not limited to a modified bijective function.

In one or more embodiments, an Optical Character Recognition (OCR) technique is a technique of mechanical or electronic conversion of images of typed, handwritten or printed text into a machine-encoded text. An Intelligent Character Recognition (ICR) technique is an advanced Optical Character Recognition technique or a handwriting recognition system that allows fonts and different styles of handwriting to be learned by a computer to improve an accuracy and recognition levels.

Another cheque image may be generated, by overlaying the one or more zones of sensitive information with the one or more aliased characters, as in step 212. In one or more embodiments, an alias image may be created based on one or more aliased characters. The alias image may be overlaid on the top of the cheque image. In one or more embodiments, the overlaying of the alias image may be masking of the one or more zones of the sensitive information of the cheque image.

In one or more embodiments, the alias image may be created based on the one or more aliased characters through imaging technique. The imaging technique may be, but not limited to an image morphing technique, a text to image conversion technique, an image segmentation technique and an image inpainting technique.

In one or more embodiments, a masked image may be unmasked by extracting the one or more aliased characters from the masked image. The masked image may be a cheque image generated as in step 212 and/or the cheque image overlaid with the alias image. The extracted alias information may be used to fetch original characters of the one or more zones of sensitive information using the aliasing rule. Original characters may be the characters extracted one or more characters. Another image may be created using the original characters and may be overlaid on the one or more zones of sensitive information to obtain the cheque image with the original characters.

Figure 3:
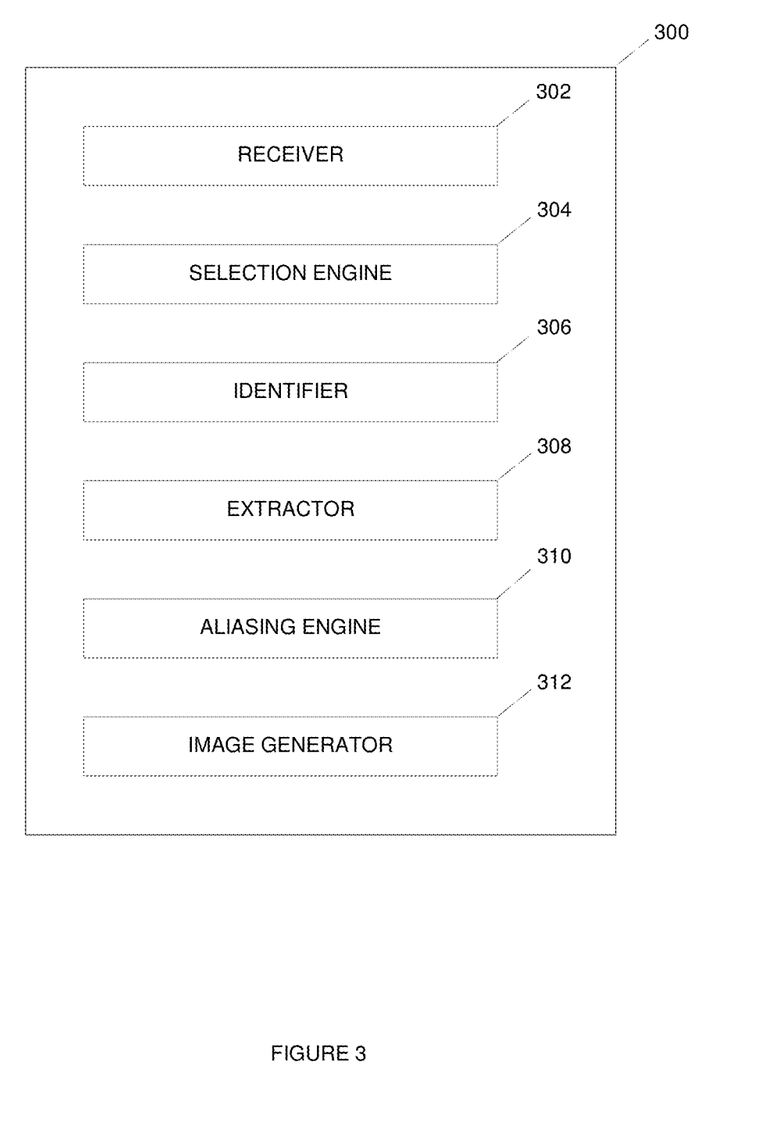
FIG. 3 is a block diagram, illustrating a system for masking of a cheque image based on one or more access privileges assigned to a user, according to one or more embodiments.

FIG. 3 is a block diagram, illustrating a system 300 for masking of a cheque image based on one or more access privileges assigned to a user, according to one or more embodiments. The system 300 may include a receiver 302, a selection engine 304, an identifier 306, an extractor 308, an aliasing engine 310 and an image generator 312.

In one or more embodiments, the receiver 302 communicatively coupled with the cheque masking engine through a network, may be configured to receive a cheque image. In another embodiment, one or more cheque images may be received at the cheque masking engine. The received cheque image may be of, but not limited to a Camera Image File Format (CIFF) and an X9 format. Information of one or more pixels and metadata associated with the cheque image may be extracted.

In one or more embodiments, the information of one or more pixels may be referred as image data. The information of one or more pixels may be, but not limited to an intensity value(s) at each location of the one or more pixels, one or more statistical measures computed on the intensity value(s) of a neighbor pixels of each of the one the one or more pixels, and one or more features derived based on the intensity values(s) of the neighbor pixels of each of the one the one or more pixels. The one or more features may be a result of one or more mathematical functions operating on the intensity value(s) of the neighbor pixels of each of the one the one or more pixels.

In one or more embodiments, the information of the one or more pixels may be another representation of the cheque image. The intensity values(s) of each location of the one or more pixels may be replaced by another value through one or more predefined mathematical functions. The one or more mathematical functions may be applied on the intensity value(s) of the one or more pixels of the cheque image. The intensity value(s) of the one or more pixels may one or more values indicating a color or a monochrome value at each location of the one or more pixels of the cheque image.

In one or more embodiments the metadata associated with the cheque image may be, but not limited to date and time of cheque deposit, a camera/scanner information used for scanning the cheque image, a depositor name, face value of a cheque, a cheque number, a routing number, a branch code, and a day-wise serial number of the cheque.

The selection engine 304 may be configured to select a cheque template from one or more cheque templates, through the computer network based on the metadata associated with the cheque image. The one or more cheque templates may be stored in a non-transitory computer readable storage medium associated with the cheque masking engine over the computer network. In one or more embodiments, the non-transitory computer readable storage medium may be referred as a database. The identifier 306 may be configured to identify one or more zones of sensitive information associated with the cheque image, based on the one or more access privileges assigned to the user and a comparison with the selected cheque template.

The extractor 308 may be configured to extract one or more characters from the one or more identified zones of sensitive information, through a character recognition technique. The character recognition technique may be, but not limited to an Optical Character Recognition (OCR) technique and an Intelligent Character Recognition (ICR) technique. The extracted one or more characters may be a typed character and/or a handwritten character. The aliasing engine 310 may be configured to alias the extracted one or more characters based on one or more aliasing rules. The one or more aliasing rules may be, but not limited to a modified bijective function.

The image generator 312 may be configured to generate another cheque image, by overlaying the one or more zones of sensitive information with the one or more aliased characters.

In one or more embodiments, the image generator may be configured to create an alias image based on the one or more aliased characters. The alias image may be overlaid on the top of the cheque image. In one or more embodiments, the overlaying of the alias image may be masking of the one or more zones of the sensitive information of the cheque image.

Figure 4:
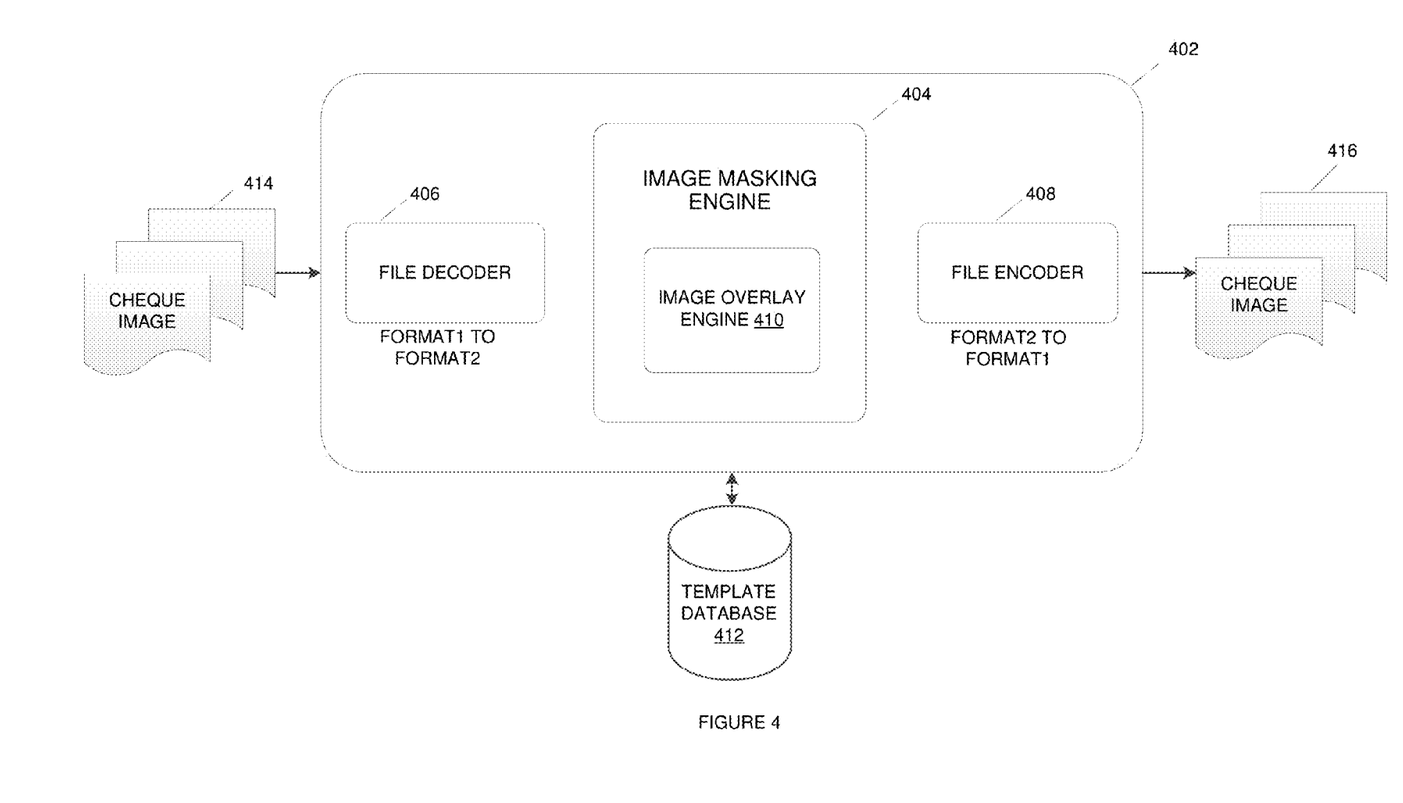
FIG. 4 is a block diagram, illustrating components associated with masking of a cheque image based on one or more access privileges assigned to a user, according to one or more embodiments.

FIG. 4 is a block diagram, illustrating components associated with masking of a cheque image based on one or more access privileges assigned to a user, according to one or more embodiments. In one or more embodiments, a cheque masking engine 402 may include an image masking engine 404, a file decoder 406, and a file encoder 408. The cheque masking engine may be communicatively coupled to a template database 412, over a computer network. The image masking engine 404 may include image overlay engine 410. The file decoder 406 may convert one or more files from a format1 to a format2. The file encoder 408 may covert the one or more files from the format2 to the format1.

In one or more embodiments, the format1 and the format2 may be, but not limited to a Camera Image File Format (CIFF) and an X9 format. The one or more files may be, but not limited to an image file. A cheque image 414 may be provided as input to the cheque masking engine 402. A cheque image 416 may be obtained as output from the cheque masking engine 402. In one or more embodiments, the cheque image 416 may be a masked cheque image.

In one or more embodiments, the file decoder 406 may be configured to extract an image information and a text information from the cheque image. The text information may be a collection of metadata associated with the cheque image and/or one or more characters extracted from the cheque image. The image masking engine 404 may be configured to select a cheque template from one or more cheque templates stored in the template database 412, based on the extracted image information and the text information. The image masking engine 404 may be configured to identify a zone of sensitive information in the cheque image. In one or more embodiments, one or more zones of sensitive information may be identified. The identification of zone of sensitive information may be performed based on one or more access privileges assigned to the user and a comparison of the cheque template with the cheque image. In one or more embodiments, one or more zones of sensitive information may be identified on the cheque image. The one or more zones of sensitive information may be of geometrical shape such as a circle, a square, a rectangle and/or an oval.

In one or more embodiments, the user may be, but not limited to an auditor, a teller, a bank manager, a customer, an external entity such as a third party organization processing cheques, and/or a system administrator. The one or more access privileges assigned to the user may be, but not limited to audit, read, search, aggregate, count, store, mask and/or unmask.

The image masking engine 404 may be configured to extract one or more characters from the zone of sensitive information. The extracted one or more characters may be aliased based on one or more aliasing rules. The one or more aliasing rule may be a user defined function. The user defined function may be a mathematical function, but not limited to a modified bijective function.

In one or more embodiments, the image masking engine 404 may be configured to create an alias image based on the aliased one or more characters. The image overlay engine 410 may be configured to overlay the alias image on the zone of sensitive information of the cheque image. The image masking engine 404 may be configured to generate another cheque image based on the alias image overlaid on the zone of sensitive information of the cheque image.

In one or more embodiments, the file encoder 408 may be configured to generate another cheque image based on the overlay of the alias image performed by the image overlay engine 410. The file encoder 408 may be further configured to convert the extracted image information and the text information into, but not limited to image format.

Figure 5:
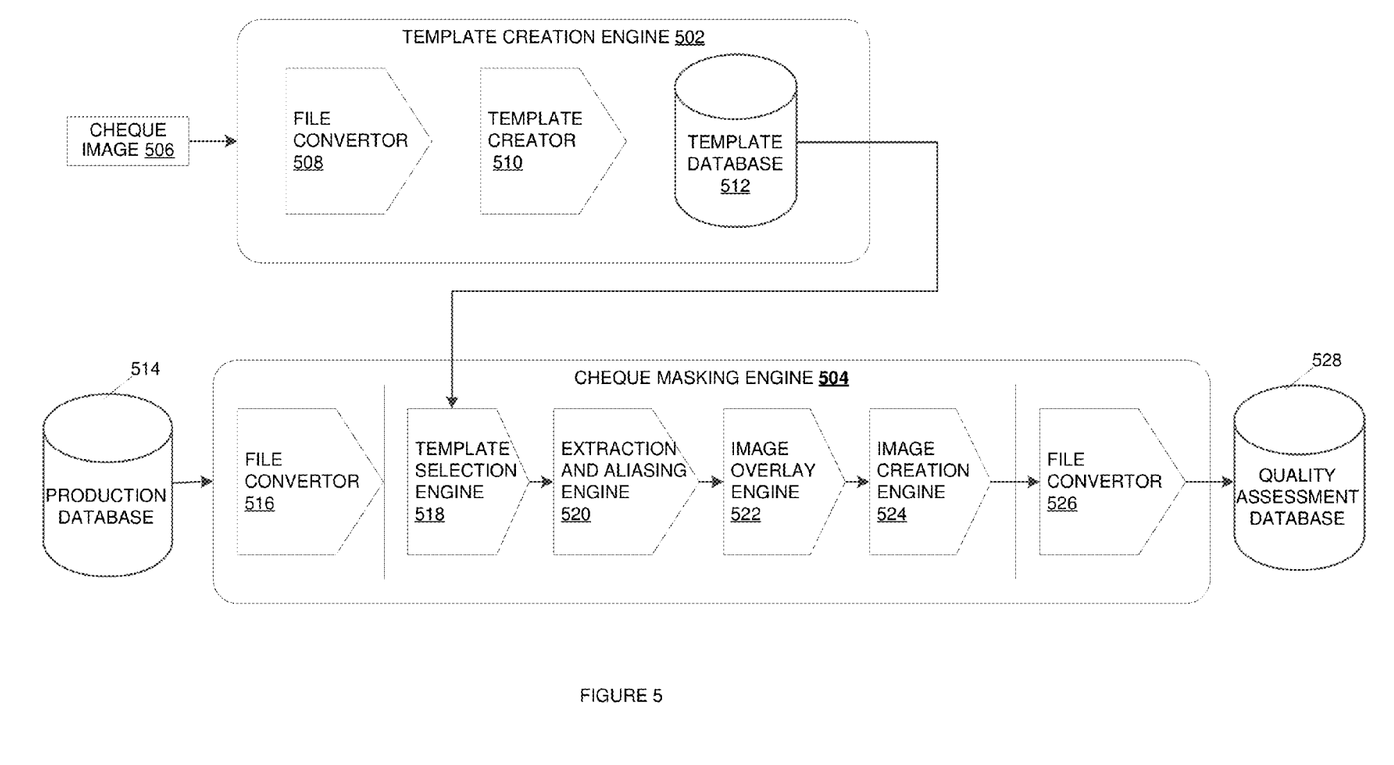
FIG. 5 is a diagram, illustrating components associated with template creation and masking of a cheque image based on one or more access privileges assigned to a user, according to one or more embodiments.

FIG. 5 is a diagram, illustrating components associated with template creation and masking of a cheque image based on one or more access privileges assigned to a user, according to one or more embodiments. In one or more embodiments, a template creation engine 502 may include a file convertor 508, a template creator 510, and a template database 512. A cheque masking engine 504 may include a file convertor 516, a template selection engine 518, an extraction and aliasing engine 520, an image overlay engine 522, an image creation engine 524, and a file convertor 526. The cheque masking engine may be communicatively coupled with a production database 514 and a quality assessment database 528, over a computer network.

The template creation engine 502, may be configured to receive a cheque image 506. The file convertor 508 may be configured to convert the received cheque image 506, from format1 to format2.

In one or more embodiments, the format1 may be, but not limited to a Camera Image File Format (CIFF) and an X9 format. The format2 may be pixel information and associated metadata with the cheque image 506.

The template creator 510 may be configured to create one or more cheque templates based on the pixel information and metadata information of the cheque image 506. The created one or more cheque templates may be stored in the template database 512.

In one or more embodiments, new cheque template(s) may be associated with cheque field information. For example, one or more characters following a 'Pay' field in a cheque image may be a payee name. One or more characters following Dollar symbol in the cheque image may be an amount to be paid to a payee by cheque.

The production database 514 may be configured to store one or more cheque images that need to be masked. In one or more embodiments, a cheque image(s) may be received at the cheque masking engine 504 from the production database 514. The file convertor 516 may be configured to convert the cheque image(s) from format1 to format2. The format1 may be, but not limited to a Camera Image File Format (CIFF) and/or an X9 format. The format2 may be a raw data of the cheque image(s). The raw data may be, but not limited to a pixel information and a metadata information of the cheque image(s). The template selection engine 518 may be configured to select a cheque template from the one or more templates stored in the template database 512.

In one or more embodiments, selection of the cheque template from one or more cheque templates may be performed based on one or more methods. The one or more methods may be, but not limited to geometric template selection, template anchored on phrase and template anchored on image blob.

In one or more embodiments, the geometric template selection method may be performed based on comparison of the cheque image with the one or more cheque templates stored in the template database 512. The comparison may be performed based on matching a bank and/or a financial institution information associated with the cheque image with a bank and/or a financial institution related information associated with the one or more cheque template. The bank and/or the financial institution information may be obtained based on the metadata associated with the cheque image and one or more cheque templates. In another embodiment, the bank/financial institution information may be extracted from the cheque image and/or one or more cheque templates through a character recognition technique but not limited to an Optical Character Recognition (OCR) technique.

Figure 6:
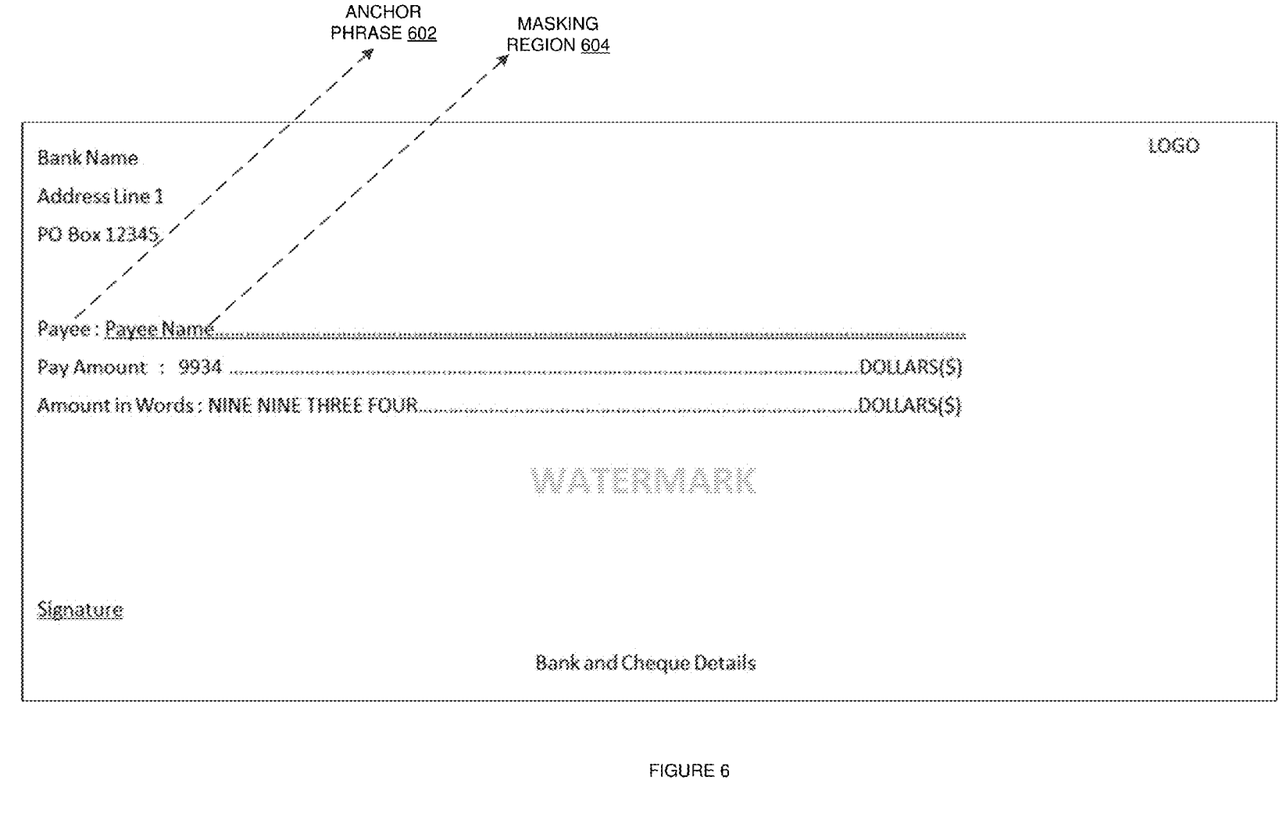
FIG. 6 is a cheque image, illustrating anchor phrase and masking region of a cheque image, according to one or more embodiments.

In one or more embodiments, the template anchored on phrase method may be performed based on detection of a phrase associated with the cheque image(s). The phrase may also be referred as anchor phrase. A cheque image in FIG. 6, illustrates a sample cheque image with an anchor phrase 602 and a masking region 604. The masking region 604 may also be referred as a zone of sensitive information. The cheque image(s) and the one or more cheque templates may be compared to select a cheque template from the one or more cheque templates. In another embodiment, the anchor phrase 602 may be used to identify the zone of sensitive information, based on mapping of the anchor phrase associated with the cheque image(s) and an anchor phrase associated with the one or more cheque templates.

In one or more embodiments, the anchor phrase 602 may be identified based on a character recognition technique. The character recognition technique may be, but not limited to an Optical Character Recognition (OCR) technique.

In one or more embodiments, a cheque template from one or more cheque templates may be selected based on the template anchored on image blob method. A blob on a cheque image is defined as a region with a connected set of pixels containing text/data. A pixel is said to be connected to another pixel, if the pixel contains at least one text/data pixel as one of an eight neighbor pixels.

One or more blobs on the cheque image(s) may be detected. One or more centroids may be computed for the one or more blobs on the cheque image(s). One or more centroids associated with the one or more cheque templates may be obtained. In one or more embodiments, the one or more centroids associated with the one or more cheque templates may be stored along with a pixel information and a metadata information, in a database. In one or more embodiments, the pixel information of the cheque template may include one or more centroids associated with the one or more cheque templates.

The one or more cheque templates and/or the cheque image(s) may be brought at a same resolution for comparison. The cheque image(s) may be compared with each of the one or more cheque templates, by overlaying the cheque image(s) on each of the one or more cheque templates. A distance between the one or more centroids of each of the one or more image blobs of the cheque image(s) and each of the one or more image blobs of the each of the one or more cheque images may be determined. The distance may be determined based on, but not limited to a Euclidean distance and/or Hausdorff distance. An average value of the distance is determined. A cheque template with the minimum average value may be selected to identify the one or more zones of sensitive information associated with the cheque image(s).

The template selection engine 518 may be further configured to identify a one or more zones of sensitive information associated with the cheque image(s). The one or more zones of sensitive information on the cheque image(s) may be based on one or more access privileges assigned to the user and a comparison with the selected cheque template.

In or more embodiments, a template from the one or more templates may be selected based on the geometrical template selection method and the zone of sensitive information may be identified based on the template anchored on phrase method and/or the template anchored on image blob method.

The user may be one of one or more users. At least one zone among the one or more zones of sensitive information may be selected based on one or more access privileges assigned to the user. Which zone of sensitive information among one or more zones of sensitive information need to be masked may be decided based on the one or more access privileges assigned to the user. For example, masking only amount field of the cheque image(s) and/or masking the amount field along with a payee filed, may be decided based on the one or more access privileges assigned to the user.

In one or more embodiments, the one or more users may be, but not limited to an auditor, a teller, a bank manager, a customer, an external entity such as a third party organization processing cheques and/or a system administrator. The one or more access privileges assigned to the one or more users may be, but not limited to audit, read, search, aggregate, count, store, mask and/or unmask.

In one or more embodiments, each of the one or more users may be associated with set of cheque templates with a predefined one or more zones of sensitive information associated with the cheque image(s).

In one or more embodiments, the extraction and aliasing engine 520 may be configured to extract one or more characters associated with the one or more zones of sensitive information. The one or more characters may be extracted based on a character recognition technique. The character recognition technique may be, but not limited to an Optical Character Recognition (OCR) technique and an Intelligent Character Recognition (ICR) technique.

The extraction and aliasing engine 520 may be further configured to alias the extracted one or more characters. One or more characters may be aliased to generate one or more alias characters based on one or more aliasing rule. The one or more aliasing may be a user defined function. The user defined function may be a mathematical function, but not limited to a modified bijective function.

The image creation engine 524 may be configured to create one or more alias images. The one or more alias images may be created based on the one or more alias characters. The one or more alias images may be overlaid one the one or more zones of sensitive information.

In one or more embodiments, the image creation engine may be further configured to create another cheque image by overlaying one or more zones of sensitive information with the one or more aliased characters.

The file convertor 526 may be configured to convert the cheque image(s) from the format2 to format1. The format1 may be, but not limited to a Camera Image File Format (CIFF) and an X9 format. The format2 may be a raw data of the cheque image. The raw data may be, but not limited to a pixel information and a metadata information of the cheque image(s).

In one or more embodiments, the file convertor 526 may be further configured to update the raw data associated with the cheque image(s).

The converted cheque image(s) may be stored in the quality assessment database 528 communicatively coupled with the cheque masking engine 504, through the computer network.

In one or more embodiments, multi-layer masking of a cheque image may be achieved. A zone of sensitive information of the cheque image may be masked based on one or more access privileges of a user. Another user may mask the cheque image by selecting the zone of sensitive information and/or another zone of sensitive information. The multi-layer masking of the cheque image may render the cheque image to a user handling the cheque image with the masked sensitive fields. The sensitive fields to be masked may be decided based on one or more access privileges assigned to the user handling the cheque image.

In one or more embodiments, masking may be defined as hiding in information from being disclosed. Unmasking may be a recovery of the hidden information. The hidden information may be also be referred as an original character(s) and/or an original information.

In one or more embodiments, unmasking of a masked cheque may be performed. In one embodiment, alias character(s) may be extracted from the masked cheque image. Original character(s) may be obtained based on an aliasing rule, used for masking. The original characters may be overlaid on the masked cheque image. In another embodiment, an overlaid image(s) on the one or more zones of sensitive information may be removed. The removal of the overlaid image(s) may be based on one or more access privileges assigned to a user.

In one or more embodiments, a bijective function may be a user defined function. One or more alias characters may be obtained based on the bijective function. The Table 1 illustrates the bijective function to obtain alias values of extracted values of a cheque image (masking). The Table 2 illustrates the bijective function to obtain the values extracted from the cheque image based on the alias values (unmasking).

TABLE 1

| x | f(x) | Time Stamp | Sum | g (time_stamp) | h (time_stamp) | Alias Values |
|---|---|---|---|---|---|---|
| 1 | 7 | May 4, 2015 16:36 | 2076 | 180 | 436 | 623 |
| 2 | 10 | Sept. 30, 2015 17:30 | 2101 | 192 | 548 | 750 |
| 3 | 13 | Mar. 30, 2015 20:45 | 2113 | 197 | 512 | 722 |
| 4 | 16 | Jan. 30, 2015 23:05 | 2074 | 179 | 505 | 700 |
| 5 | 19 | Apr. 30, 2015 18:15 | 2082 | 183 | 819 | 1021 | wherein, $f(x)=3*x+4$;

$g(time\_stamp)=ROUNDUP(EXP(sumOfComponents/400),0)$;

$h(time\_stamp)=ROUNDUP(PRG\_Output*1000,0)$; and

Sum is a total of time stamp components (for e.g., for the timestamp 9/30/2015 17:30, the Sum is 9+30+2015+17+30=2101).

TABLE 2

| Alias Values | h(.) | Time Stamp | Sum | g (time_stamp) | h(.) − g(.) | Applying f⁻¹(x) |
|---|---|---|---|---|---|---|
| 623 | 436 | May 4, 2015 16:36 | 2076 | 180 | 7 | 1 |
| 750 | 548 | Sept. 30, 2015 17:30 | 2101 | 192 | 10 | 2 |
| 722 | 512 | Mar. 30, 2015 20:45 | 2113 | 197 | 13 | 3 |
| 700 | 505 | Jan. 30, 2015 23:05 | 2074 | 179 | 16 | 4 |
| 1021 | 819 | Apr. 30, 2015 18:15 | 2082 | 183 | 19 | 5 | wherein, $f^{-1}(x)$ is an inverse function of f(x).

In the present embodiment, $f^{-1}(x)=(x-4)/3$.

In one or more embodiments, a bijective function may map values from a domain to a co-domain. Each value in the domain may contain unique image in the co-domain. Also, each value in the co-domain may have a pre-image in the domain. In one or more embodiments, the bijective function may be one or more of, but not limited to a linear function, a composition of linear functions, a polynomial function, a matrix, a permutation and a substitution.

Masking value based on the bijective function may not be secure, since knowledge of adequate number of keys and/or value pairs may reconstruct the bijective function. A random value may be generated from a pseudorandom number generator by providing a seed and the random value is added to an alias value to increase security. The modified bijective function may be derived based on the random value. Different bijective functions may be applied based on one or more access privileges associated with a user. Hence, different alias values may be generated for different users.

In one or more embodiments, one or more font properties, not limited to a font size, a font type and/or font color may be retrieved based on a template selected from one or more templates. Color intensities of background image of one or more zones of sensitive information may be stored with metadata associated with the template. An alias image with an alias character(s) may be created based on the one or more font properties. A background of the alias character(s) may be selected based on metadata associated with the template.

In one or more embodiments, a system for masking of a cheque image based on one or more access privileges assigned to a user is disclosed. The system may be configured to receive, at a cheque masking engine, a cheque image. One or more pixel information and metadata information associated with the cheque image may be extracted. A cheque template from one or more cheque templates may be selected based on a metadata associated with the cheque image. The one or more cheque templates may be stored in a non-transitory computer readable storage medium associated with the cheque masking engine over a computer network.

One or more zones of sensitive information associated with the cheque image may be identified based on the one or more access privileges assigned to the user and a comparison with the selected cheque template. One or more characters from the one or more zones of sensitive information may be extracted through a character recognition technique. The character recognition technique may be, but not limited to an optical character recognition and/or an intelligent character recognition.

The extracted one or more characters from the one or more zones of sensitive information may be aliased based on one or more aliasing rules. The one or more aliasing rules may be a user defined function. The user defined function may be, but not limited to a modified bijective function. One or more alias images may be created based on the extracted one or more characters. The one or more alias image may be overlaid on the cheque image. The overlay may be, a masking of one or more zones of sensitive information with the one or more alias images.

Figure 7:
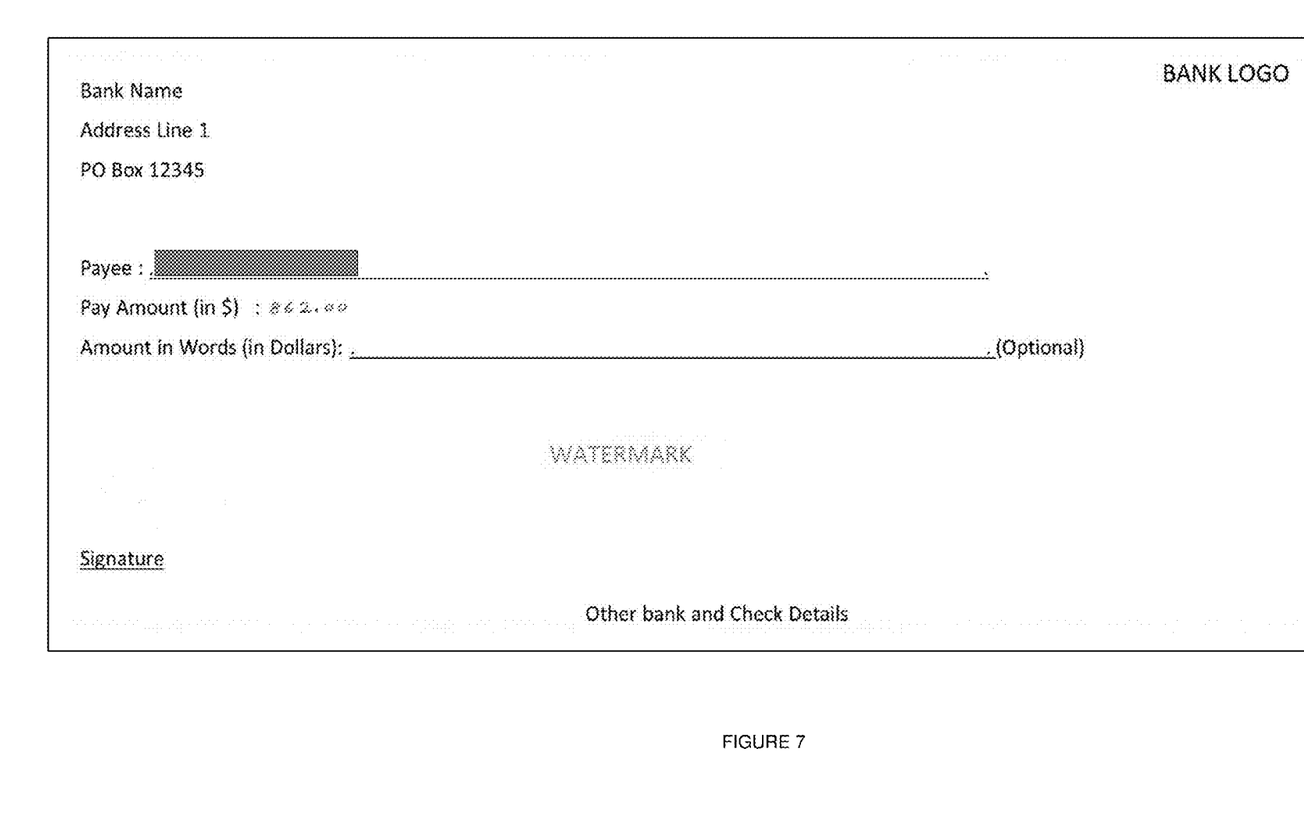
FIG. 7 is a sample cheque image, fed as input to a cheque masking engine, according to one example embodiment.

FIG. 7 illustrates a cheque image, according to one or more embodiments. A pay amount field of the cheque image contains characters. The characters may be extracted based on or more character recognition techniques. One or more aliasing rules may be applied on the extracted characters to generate an alias character and/or alias image.

Figure 8:
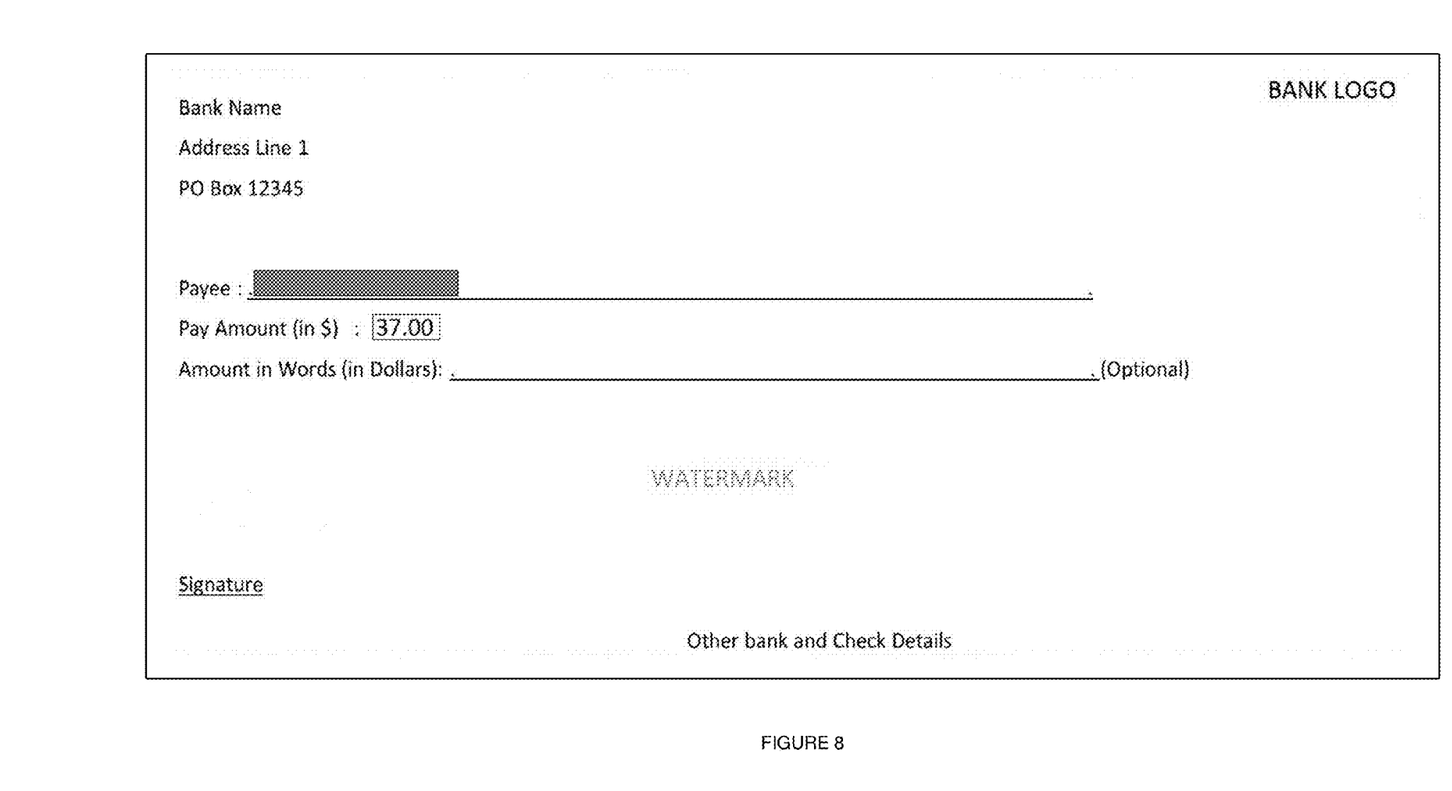
FIG. 8 is a cheque image, generated after masking the cheque image, according to one or more embodiments.

FIG. 8 illustrates a masked cheque image, according to one or more embodiments. The pay amount filed may be masked with alias characters. One or more characters extracted from the cheque image as illustrated in FIG. 7, may be aliased to generate characters as illustrated in pay amount filed of the check image in FIG. 8. Selection of one or more fields of the cheque image may be performed based on one or more access privileges associated with one or more users.

In an example embodiment, a financial institution such as Bank of America may process millions of cheques per day. As number of cheques is huge and manual processing is a tedious job, the financial institution may outsource cheque processing to firm located in a different geographies such as India and Malaysia. The cheque processing firm and/or one or more users associated with the cheque processing firm may be assigned with one or more access privileges. The financial institution may share millions of cheque images with the cheque processing firm over a computer network. The cheque images may be obtained from physical cheques being passed into an image scanner. The financial institution may also store the millions of cheque images on a cloud storage and/or a non-transitory computer readable storage medium associated with the financial institution over a computer network. Access may be provided to the cheque processing firm as per the requirement. The access provided to the cheque processing firm in different geographies may be a distributed access to data stored in the cloud storage, with appropriate access privileges. The cloud storage and the non-transitory compute readable storage medium and/or the cloud storage may be set up in the distributed environment controlled by the financial institution.

An encryption and a decryption of the cheque images may be performed for secure transfer of cheque images between the cheque processing firm and the financial institution. The encryption and the decryption may help to overcome man in the middle attack as the cheque images are more prone to theft on a move. The financial institution may encrypt the cheque images before sending the cheque images to the cheque processing firm. The cheque processing firm may decrypt the cheque images. Post processing, the cheque processing firm may encrypt the processed cheque images. The financial institution may decrypt the cheque images received from the cheque processing firm. The transfer of cheque image between the financial institution and the cheque processing firm may happen over a secure channel.

The present disclosure may allow multiple users with multiple roles to access the data, wherein each of the multiple users can see masked data differently at different times as data masking functions considers the timestamp while masking the data. The present disclosure may also perform recoverability of the masked data based on user privileges.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through the retail portal to perform functions through operations on input and generation of output. These input and output operations may be performed by a processor. The medium readable through the retail portal may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

One or more non-transitory computer-readable media can comprise computer-executable instructions that, when executed, cause a computing system to perform any of the methods described herein.

Accordingly, the specification and drawings are to be regarded in an illustrative rather than a restrictive sense.

What is claimed is:

1. A computer implemented method for masking of sensitive fields on at least one cheque image based on at least one access privilege assigned to a user, comprising:
   in one or more non-transitory computer-readable storage media, storing a plurality of cheque-depicting cheque templates created based on pixel information and metadata associated with a plurality of input images of cheques;
   receiving, through a processor, at a cheque masking engine, at least one cheque image to be masked;
   extracting, through the processor, pixel information and metadata associated with the at least one cheque image to be masked;
   selecting, through the processor, a cheque-depicting cheque template from the plurality of stored cheque-depicting cheque templates, the selecting based on the extracted pixel information and metadata associated with the at least one cheque image to be masked;
   comparing, through the processor, the at least one cheque image to be masked with the selected cheque-depicting cheque template;
   identifying, through the processor, at least one zone of sensitive information associated with the at least one cheque image to be masked based on the at least one access privilege assigned to the user and the comparing of the at least one cheque image to be masked with the selected cheque-depicting cheque template;
   extracting, through the processor, at least one character from the identified at least one zone of sensitive information, through a character recognition technique;
   aliasing, through the processor, the extracted at least one character from the at least one zone of sensitive information based on at least one aliasing rule; and
   generating, through the processor, a masked cheque image by overlaying the at least one zone of sensitive information with the aliased extracted at least one character.

2. The method of claim 1, wherein the character recognition technique is at least one of an optical character recognition or an intelligent character recognition.

3. The method of claim 1, wherein the at least one aliasing rule is a modified bijective function selected based on the least one access privilege assigned to the user.

4. The method of claim 1, wherein the selecting of the cheque-depicting cheque template from the plurality of cheque-depicting cheque templates is performed by one or more of a geometric template selection method, a template anchored on phrase method, or a template anchored on image blob method.

5. The method of claim 1, wherein the at least one access privilege assigned to the user comprises one or more of audit, read, search, aggregate, count, store, mask, or unmask.

6. The method of claim 1, wherein the plurality of cheque-depicting cheque templates are created by a process comprising converting the plurality of input images of cheques from a first format to a second format, wherein the first format comprises a Camera Image File Format (CIFF) or an X9 format, and wherein the second format comprises raw data of the plurality of input images of cheques, the raw data comprising the pixel information and metadata associated with the plurality of input images of cheques.

7. A system for masking sensitive fields on at least one cheque image based on at least one access privilege assigned to a user, comprising:
   a computer network;
   at least one processor; and
   at least one memory unit operatively and communicatively coupled to the at least one processor over the computer network and having instructions stored thereon that, when executed by the at least one processor, cause the at least one processor to:
   store a plurality of cheque-depicting cheque templates created based on pixel information and metadata associated with a plurality of input images of cheques;
   receive, at a cheque masking engine over the computer network, at least one cheque image to be masked;
   extract pixel information and metadata associated with the at least one cheque image to be masked;
   select a cheque-depicting cheque template from the plurality of cheque-depicting cheque templates through the computer network based on the extracted pixel information and metadata associated with the at least one cheque image to be masked;
   compare the at least one cheque image to be masked with the selected cheque-depicting cheque template;
   identify at least one zone of sensitive information associated with the at least one cheque image to be masked based on the at least one access privilege assigned to the user and the comparison of the at least one cheque image to be masked with the selected cheque-depicting cheque template;

extract at least one character from the identified at least one zone of sensitive information through a character recognition technique;

alias the extracted at least one character from the at least one zone of sensitive information based on at least one aliasing rule; and generate a masked cheque image by overlaying the at least one zone of sensitive information with the aliased extracted at least one character.

8. The system of claim 7, wherein the plurality of cheque-depicting cheque templates are stored in a template database comprising a non-transitory computer readable storage medium associated with the cheque masking engine over the computer network.

9. The system of claim 7, wherein the character recognition technique is at least one of an optical character recognition or an intelligent character recognition.

10. The system of claim 7, wherein the at least one aliasing rule is a modified bijective function that considers a timestamp corresponding to a time at which the user will see the masked cheque image, such that multiple users see masked data differently at different times.

11. A computer implemented method for masking of sensitive fields on at least one cheque image based on at least one access privilege assigned to a user, comprising:

in one or more non-transitory computer-readable storage media, storing a plurality of cheque-depicting cheque templates created based on pixel information and metadata associated with a plurality of input images of cheques;

receiving, through a processor, at a cheque masking engine over a computer network, at least one cheque image to be masked;

extracting, through the processor, pixel information and metadata associated with the at least one cheque image to be masked;

selecting, through the processor, a cheque-depicting cheque template from the plurality of cheque-depicting cheque templates through the computer network, the selecting based on the extracted pixel information and metadata associated with the at least one cheque image to be masked;

comparing, through the processor, the at least one cheque image to be masked with the selected cheque-depicting cheque template;

identifying, through the processor, at least one zone of sensitive information associated with the at least one cheque image to be masked based on the at least one access privilege assigned to the user and the comparing of the at least one cheque image to be masked with the selected cheque-depicting cheque template;

extracting, through the processor, at least one character from the identified at least one zone of sensitive information, through a character recognition technique;

aliasing, through the processor, the extracted at least one character from the at least one zone of sensitive information based on at least one aliasing rule;

creating, through the processor, at least one alias image comprising the aliased extracted at least one character; and overlaying, through the processor, the at least one alias image on the at least one cheque image to be masked.

12. The method of claim 11, wherein the overlaying comprises masking the at least one zone of sensitive information with the at least one alias image.

13. The method of claim 12, further comprising:
unmasking the at least one cheque image by removing the at least one alias image from the at least one cheque image based on one or more access privileges assigned to a user.

14. The method of claim 11, wherein the character recognition technique is at least one of an optical character recognition or an intelligent character recognition.

15. The method of claim 11, wherein the at least one aliasing rule is a modified bijective function.

16. The method of claim 11, wherein the at least one alias image is created based on the aliased extracted at least one character through an imaging technique, the imaging technique comprising one or more of an image morphing technique, a text to image conversion technique, an image segmentation technique, or an image inpainting technique.

17. The method of claim 11, wherein the metadata associated with the at least one cheque image to be masked comprises:
a date and time of cheque deposit;
a camera and/or scanner information used for scanning the at least one cheque image to be masked;
a depositor name;
a face value of the cheque;
a cheque number;
a routing number;
a branch code; or
a day-wise serial number of the cheque.

18. A system for masking sensitive fields on a cheque image based on at least one access privilege assigned to a user, comprising:
a computer network;
at least one processor; and
at least one memory unit operatively and communicatively coupled to at least one processor over the computer network and having instructions stored thereon that, when executed by the at least one processor, cause the at least one processor to:
in one or more non-transitory computer-readable storage media, create a plurality of cheque-depicting cheque templates based on pixel information and metadata associated with a plurality of input images of cheques;
receive, at a cheque masking engine over a computer network, at least one cheque image to be masked;
extract pixel information and metadata associated with the at least one cheque image to be masked;
select a cheque-depicting cheque template from the plurality of cheque-depicting cheque templates through the computer network based on the extracted pixel information and metadata associated with the at least one cheque image to be masked, the selecting performed by one or more of a geometric template selection method, a template anchored on phrase method, or a template anchored on image blob method;
compare the at least one cheque image to be masked with the selected cheque-depicting cheque template;
identify at least one zone of sensitive information associated with the at least one cheque image to be masked based on the at least one access privilege assigned to the user and the comparison;
extract at least one character from the identified at least one zone of sensitive information, through a character recognition technique;

alias the extracted at least one character from the at least one zone of sensitive information based on at least one aliasing rule;

create at least one alias image comprising the aliased extracted at least one character; and overlay the at least one alias image on the at least one cheque image to be masked, wherein the overlaying comprises masking the at least one zone of sensitive information with the at least one alias image.

19. The system of claim 18, wherein the character recognition technique is at least one of an optical character recognition or an intelligent character recognition.

20. The system of claim 18, wherein the at least one aliasing rule is a modified bijective function.

\* \* \* \* \*